(12) United States Patent
Li

(10) Patent No.: US 7,193,729 B1
(45) Date of Patent: Mar. 20, 2007

(54) INSTRUMENT CLUSTER WITH LASER BEAM ILLUMINATION

(75) Inventor: Kang Li, Windsor (CA)

(73) Assignee: Yazaki North America, Inc, Canton, MI (US)

( * ) Notice: Subject to any disclaimer, the term of this patent is extended or adjusted under 35 U.S.C. 154(b) by 407 days.

(21) Appl. No.: 10/834,487

(22) Filed: Apr. 29, 2004

(51) Int. Cl.
*G01B 11/14* (2006.01)
*G09G 5/00* (2006.01)
*G09G 3/00* (2006.01)
*B60Q 1/00* (2006.01)

(52) U.S. Cl. .......................... 356/614; 345/7; 345/30; 345/31; 345/32; 345/55; 340/461; 340/525

(58) Field of Classification Search ................ 356/614; 345/7, 30, 31, 32, 55, 56; 340/461, 525; 73/866.3
See application file for complete search history.

(56) References Cited

U.S. PATENT DOCUMENTS

| | | | |
|---|---|---|---|
| 3,448,458 A * | 6/1969 | Carlson et al. ............... 346/17 |
| 3,614,312 A * | 10/1971 | Fournier et al. ............. 348/205 |
| 4,213,146 A * | 7/1980 | Maiman ..................... 348/205 |
| 4,251,126 A * | 2/1981 | Minoura et al. ............. 359/206 |
| 4,340,888 A * | 7/1982 | Seroskie ....................... 345/31 |
| 4,761,715 A | 8/1988 | Brooks |
| 5,024,494 A | 6/1991 | Williams et al. |
| 5,032,924 A * | 7/1991 | Brown et al. ................ 348/759 |
| 5,051,834 A * | 9/1991 | Matui et al. ................. 348/769 |
| 5,057,827 A * | 10/1991 | Nobile et al. ................. 345/31 |
| 5,294,940 A * | 3/1994 | Wennagel et al. ............. 345/31 |
| 5,353,735 A | 10/1994 | Arai et al. |
| 5,805,119 A * | 9/1998 | Erskine et al. ................. 345/7 |
| 6,473,240 B1 | 10/2002 | Dehmlow |

FOREIGN PATENT DOCUMENTS

| | | |
|---|---|---|
| JP | 03-025318 | 2/1991 |
| JP | 06-149202 | 5/1994 |
| JP | 06-160125 | 6/1994 |

\* cited by examiner

*Primary Examiner*—Roy M. Punnoose
(74) *Attorney, Agent, or Firm*—Young Basile PC

(57) ABSTRACT

An automotive instrument cluster containing a grouping of display fields representing measured automotive operating quantities such as speed, temperature and pressure. Illumination markers which are analogs of pointers are created within the display fields from a single beam-type light source by means of a multi-faceted rotating mirror and a controller which correlates measured signal quantities representing the vehicle operating quantities to mirror angle in turning the light source on so as to create an illumination marker at a strategic position within each of the display fields. The display is refreshed 50 times per second so as to create the appearance of a continuous marker in each of the display fields. Calibration is provided by means of a separate diode sensor.

20 Claims, 2 Drawing Sheets

INSTRUMENT CLUSTER WITH LASER BEAM ILLUMINATION

FIELD OF THE INVENTION

This invention relates to analog displays for measured quantities such as automotive speed, coolant temperature, fuel level and the like, and more particularly to an instrument cluster comprising a plurality of display fields and having no conventional meter movements, pointers or other components susceptible to inertial effects.

BACKGROUND OF THE INVENTION

Automotive instrument clusters typically comprise large discreet display areas for a speedometer and a tachometer, and a number of smaller displays for coolant temperature, oil pressure, oil temperature, fuel level and the like. Arranged within and around the cluster are other indicators showing low fluid level conditions, turn signal operation, emergency light blinkers and so forth. The analog displays within the display fields are provided by means of devices having electromechanical movements for causing angular sweep of a needle across the display field. In American systems, low values of the measured quantity are typically displayed at the left side of the display field, high values at the right side of the display field, and intermediate values at incrementally spaced locations between the left and right sides.

It has become increasingly more difficult to attach cables, wires and other devices to the back side of the instrument cluster to provide all of the various desirable displays while retaining flexibility and accessability. Moreover, all of the meter movements are difficult to calibrate and to maintain in calibration.

The prior art patent to Brooks U.S. Pat. No. 4,761,715 "Laser Pointer," issued Aug. 2, 1988, shows how an analog instrument and/or a combination of analog instruments can be implemented using a light source to provide an illumination marker. The Brooks patent, however, uses a meter movement which is presumably galvanometric or step-motor-operated to rotate a laser beam from a diode laser, the degree of clockwise rotation corresponding to values of various measured quantities.

SUMMARY OF THE INVENTION

The present invention provides analog displays suitable for automotive instrument clusters and the like which displays are simple in construction, easy to fabricate in single or multiple display field configurations, easily calibrated and require no conventional meter movements. In general, this is accomplished in a system including at least one display field across which values of a measured quantity are represented in an analog fashion, a pulsed light source capable of producing a light beam, a means for causing the light beam to repeatedly pass across the display field, and a controller responsive to the measured quantity to turn the light source on where the location of the beam relative to the sides of the display field corresponds to the current value of the measured quantity. In this context, an "analog" display is one in which the positions of a marker within a display field having physical boundaries represent data values.

It should be noted that the term "beam" is used herein to refer to the beam path irrespective of whether the source is turned on or off.

In the preferred form, a cluster or array of several display fields representing different measured quantities are arranged to be served by a single light source and a means which causes the beam from the light source to repeatedly pass across all of the display fields in sequential fashion. A controller responds to plural measured quantity inputs to turn the light source on at relative locations within the display fields to represent, in position-analog style, the current values of the measured quantities.

In the preferred form, means are provided for calibrating the light beam sweep to a "zero" position at the beginning of each pass thereby eliminating the tendency for position/timing errors to accumulate in the system and cause false indications of the measured quantities in the display fields.

The display fields are arcuate in the described embodiments, but this is by way of illustration only. The display fields may be arranged in tiers or horizontal rows and the beam caused to move sequentially across and between the rows by means of a multi-faceted rotating mirror the reflective surfaces of which produce different angles of incidence between the light beam and the receiver surface of the display system within which the display field or fields are defined. The preferred form of the light source is a pulsed diode laser which can be turned on and off at precisely selected times to produce a high degree of resolution in the display fields; e.g., resolutions of 0.1 degrees per pulse in the beam sweep are readily obtained. The mirror is rotated fast enough to make at least 30 to 50 full passes across the display fields each second thereby creating the appearance of a continuous light marker in each field at the analog value position.

As also hereinafter described, analog display fields can be intermixed and/or enhanced with other types of displays called "telltales" which are non-analog in character in the sense that they do not involve indicator position changes across a display field. Such telltale indicators include low fuel warnings, turn signal arrows, brake wear indicators and the like. These telltales can be fully illuminated by causing a series of on pulses to occur over a wider sweep and without turning the pulse source off between such pulses.

Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawing wherein like reference numerals refer to like parts throughout the several views, and wherein.

DETAILED DESCRIPTION OF THE PREFERRED EMBODIMENT

Figure 1:
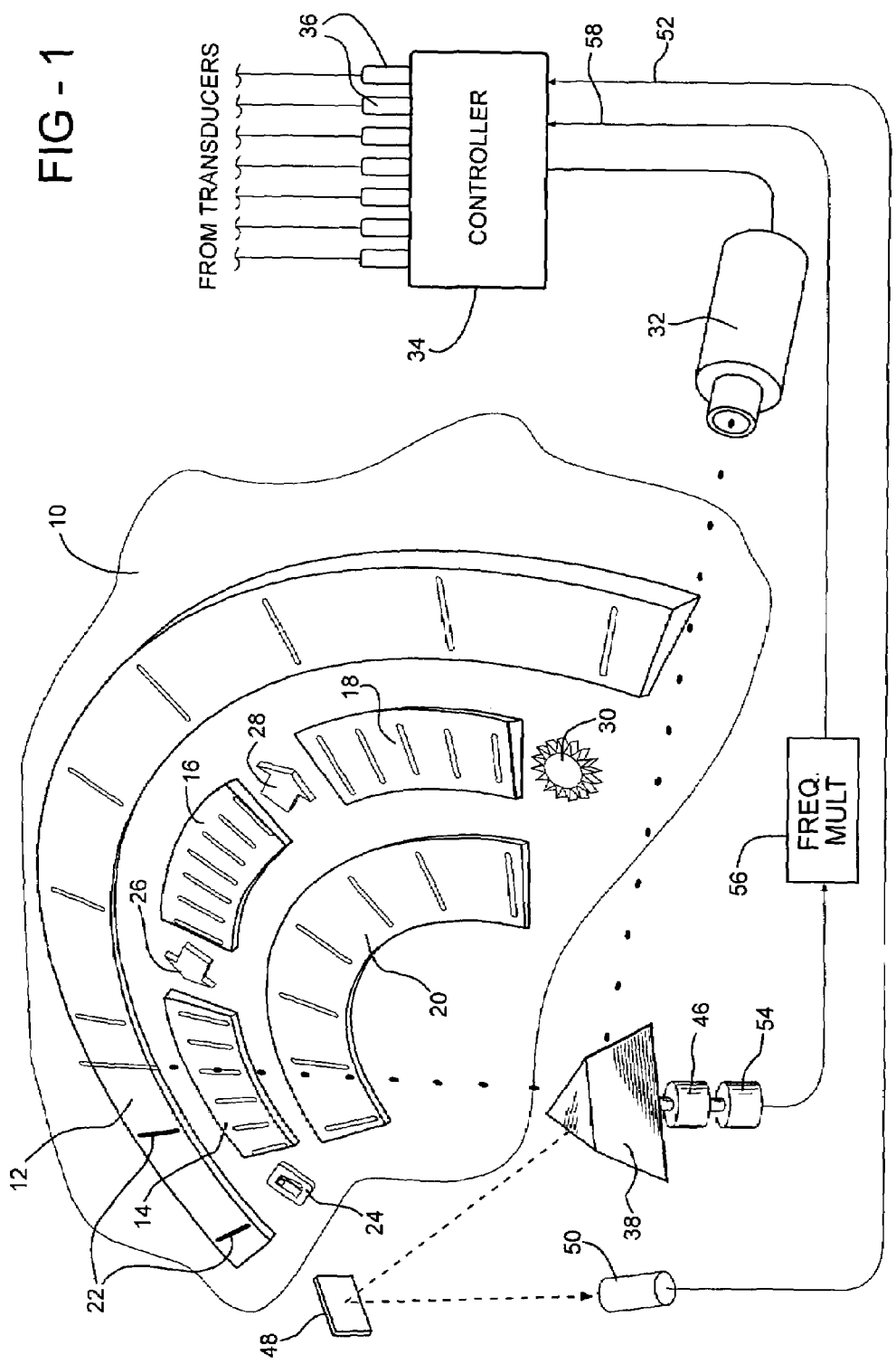
FIG. 1 is a perspective view of a representative instrument cluster and all of the components of a display system embodying the invention.

Referring to the figures, an automotive instrument cluster 10 in the form of a plastic fascia is shown in perspective to comprise a plurality of display fields 12, 14, 16, 18 and 20 arranged in three concentric tiers or horizontal rows. The outermost row is made up of the entirety of the large field display 12 and in this case may be taken to be representative of an automotive speedometer display with low values at the left end and higher values toward the rightmost or clockwise end. The middle row is made up of discreet display fields 14, 16 and 18 and may be taken to represent quantities such as coolant temperature, fuel level, oil pressure and the like. The innermost tier is made up of a single display field 20 which may be a tachyometric display of engine speed. Each tier is inclined relative to the cluster, the outermost tier having the greatest angle of inclination and the innermost tier having the smallest. All of the measured quantities mentioned above are by way of example only and are not intended in a limiting sense. Similarly, the reference to an "automotive" application and the particular arrangement of the display fields within the overall instrument cluster 10 as shown in FIG. 1 are merely representative and may be varied as desired. By way of example, the display may be for aircraft or for various parameters in a power plant.

Various indicia such as increment or scale markers 22 may be preprinted on the display fields to give values to the measured quantities in miles per hour, kilometers per hour, degrees, psi, rpm, etc. The outlines of the display fields may also be printed, embossed or otherwise created on the fascia of cluster 10 for function and aesthetic appeal.

Various non-analog displays or "telltales" including low fuel display 24, turn signal arrows 26, 28 and headlight high beam display 30 may also be provided. It will be noted that the telltales are physically arranged so as to correspond generally to one or more of the discreet tiers or horizontal rows in the particular display.

In accordance with the invention, illumination markers are created in each of the display fields, the position of each such marker relative to the left and right ends of the display fields being an analog of the measured quantity value. These illumination markers are created by a diode laser source 32 which operates in an on/off mode under the control of a high-speed digital controller 34. The controller 34 receives inputs 36 from multiple transducers capable of providing electrical signals representing instantaneous values of the various measured quantities. The conversion of the electrical signals from analog to digital form may be carried out either within the controller 34 or externally thereof by a suitable A/D converter according to the preferences of the system designer.

Figure 3:
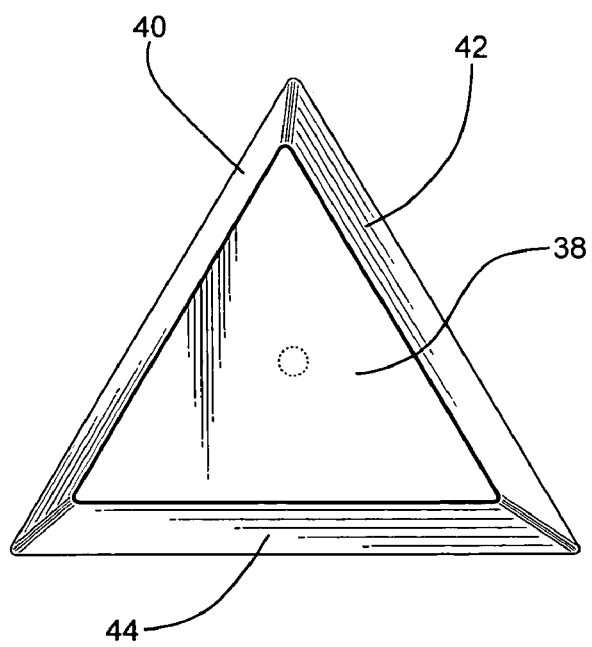
FIG. 3 is a plan view of a three-facet reflective mirror used in the system of FIGS. 1 and 2.

The laser source 32 is aimed toward a three-surface reflector 38 mounted for rotation about a vertical axis. As shown in FIG. 3, the reflector 38 has mirrored surfaces 40, 42 and 44 each of which is disposed at a different angle $\gamma_A$, $\gamma_B$, and $\gamma_C$, the surface having the angle $\gamma_A$ causing the light beam to be reflected to the inner or lowermost display field 20, the surface having the angle $\gamma_B$ causing any beam actually produced by the source to be reflected to the intermediate tier of display fields 14, 16 and 18 and the surface having the angle $\gamma_C$ causing the beam to be reflected to the top tier display field 12. The mirror is rotated by a DC motor 46 at a high and continuous rate of speed so that the beam reflection not only moves sequentially between the tiers of the display of the cluster 10 but also sweeps angularly across the display field from left to right in clockwise fashion as hereinafter explained. A full cycle of three sweeps occurs with each 360° rotation of the mirror reflector 38. It should be noted that the reflector 38 is an example of a relatively inexpensive mechanism that can be used to scan or sweep the beam across the display field. However, other means can be used to achieve the same effect. For instance, a mechanism can be employed to directly rotate the laser diode and avoid the need for a reflector.

The beam from the reflector 38 is also reflected toward a calibration reflector 48 which reflects the beam to a photo-diode sensor 50 the output of which is connected as an input 52 to the controller 34 for calibration or "zeroing" purposes hereinafter explained.

The angular position of the reflector 38 is monitored by means of a resolver, for example a rotary encoder 54, connected to the output shaft of the DC motor 46. The number of pulses per unit of angular movement is increased by means of a frequency multiplier 56 having, in this case, a multiplication factor of 30. The output of multiplier 56 is connected as an input 58 to the controller 34.

Figure 2:
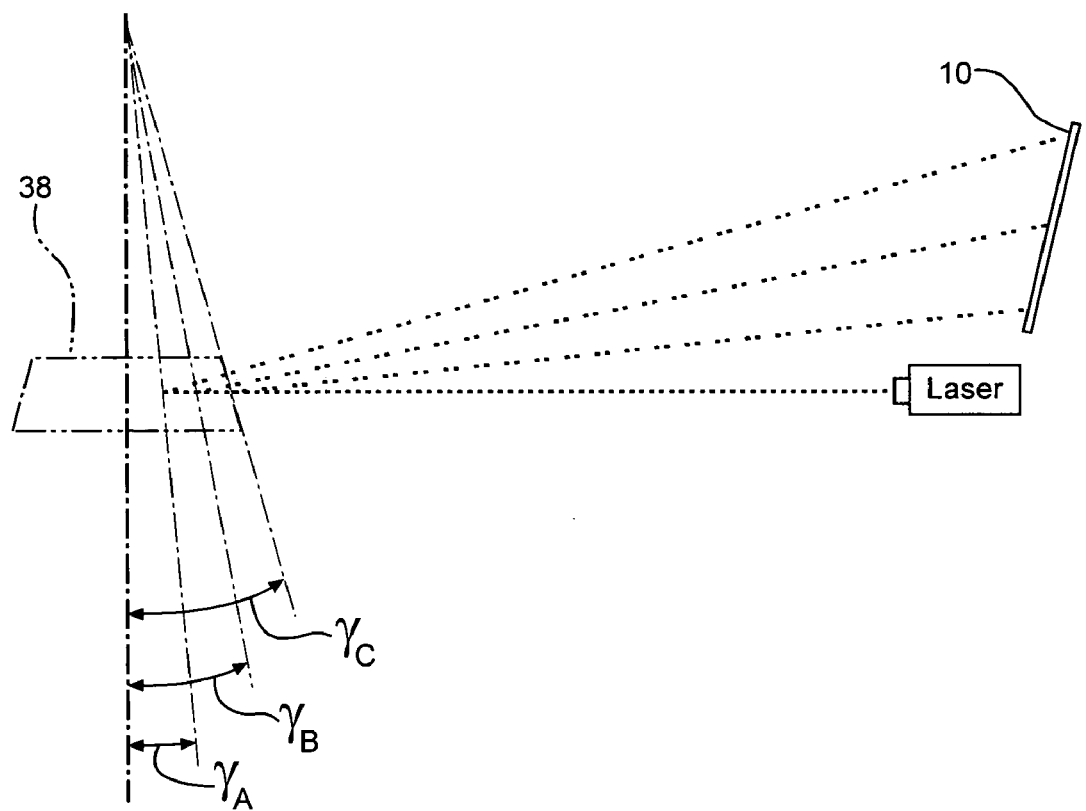
FIG. 2 is a diagram showing how the multi-faceted reflector causes the laser output beam to move between the three tiers of the display of FIG. 1.

In operation, the diode laser source 32 is turned on to produce a calibration pulse which is directed toward the reflector 48 and reflected to the photodiode 50. This resets the data in the controller 34 to the zero sweep position such that the pulses coming from the frequency multiplier 56 can be and are representative of 0.1 degree of angular movement of the laser beam in the clockwise direction starting from the leftmost position of the display field 12 to be activated. For example, this could equate to 3600 pulses per rotation of the mirror or 1200 for each horizontal beam sweep. Assuming 80% of the pulses are useable, 960 pulses are available to scale the display field 12 and 320 pulses are available for each display field 14, 16 and 18. In theory, 960 pulses across a speedometer range of 150 miles per hour allows 0.156 miles per hour resolution between consecutive pulses. Assuming, by way of example, that the display field 12 represents vehicle speed and a value of 50 miles per hour near the one-third of the display field is to be indicated, the inputs 36 from the speed transducer are converted to a pulse count representing approximately one-third of the total pulse count required to displace the light beam the full width of the display field 12; i.e., the 320th pulse. When the count from the frequency multiplier 56 reaches the data count set into a register in the controller 34, the controller output turns the laser source 32 on and a stripe-like marker of light is caused to appear in the display field 12. If an orthogonal incidence were provided, the illumination would be dot-like. However, because the cluster 10 is placed at an angle relative to the beam as shown in FIG. 2, the light from the source 32 spreads vertically into a stripe or line aesthetically similar to a pointer display. The controller turns the light source off after the next count from the frequency multiplier 56 occurs.

When the mirror rotates sufficiently to drop the beam to the center row comprising display fields 14, 16 and 18, data from the transducer inputs 36 are converted to pulse counts to cause the light source to come on at strategic times representing appropriate locations for illumination within the display fields 14, 16 and 18 to show the measured quantities. As the reflector 38 rotates further, the laser beam sweeps the lower or innermost display field 20 and the laser source 32 turned on to produce an illumination marker at the appropriate location within the field to indicate the measured signal quantity.

The entire array of display fields 12, 14, 16, 18 and 20 is scanned in sequence and repeatedly at a rate of approximately 50 times per second. Each illumination marker is "refreshed" 50 times per second and the characteristics of human sight are such that flicker will not be detected. Indeed, the human eye tends to blend the optical stimuli to create the appearance of continuous illumination markers in the five display fields 12, 14, 16, 18 and 20.

As explained above, the display fields are also enhanced and interspersed with telltales such as the turn signal display arrows 26 and 28. The telltales may be physically defined by embossed outlines and more reflective or diffusive surface patterns to cause illumination blending. The laser source 32 is turned on continuously during the entire sweep across a telltale arrow so as to "paint" the entire surface of the telltale. This sweep may be four, five or more pulses in duration to fully "paint" the telltale surface.

In implementing the system described above, it is desirable to reduce or eliminate the probabilities of cross-reflection which can occur if two reflecting surfaces of the reflector 38 are facing the output of the laser diode during an on time. If there are display fields in the cross-reflection area on both sides, false illumination markers may show up in those display area. One simple way to avoid the cross-reflection problem is to avoid putting display fields on both sides of the cross-reflection area. Manufacturing the reflector with softer, rounder edges as shown in FIG. 3 also provides a practical way of avoiding the cross-reflection problem. A desirable side benefit of this approach is to use the defocused or diffused illumination from the round edges to provide back lighting illumination in the cluster 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An analog display for a measured quantity comprising:
    a display field the relative positions within which are analog representations of values of the measured quantity;
    a pulsed light source producing a light beam;
    means for causing the light beam to repeatedly scan across the relative positions of the display field; and
    a controller responsive to the measured quantity to repeatedly turn the light source on at one or more selected scan positions such that the position of the illuminated location in the display field is an analog representation of the current value of the measured quantity.

2. An analog display as defined in claim 1 wherein the pulsed light source is a laser light source.

3. An analog display as defined in claim 1 wherein the means for causing the light beam to scan is a rating mirror.

4. An analog display as defined in claim 3 further including a motor for rotating the mirror.

5. An analog display as defined in claim 1 further including a light detector positioned to receive the beam at a reference position, the light detector being connected to the controller for calibration purposes.

6. An analog display as defined in claim 1 wherein the display field is angled relative to the light beam such that the incidence of the light beam on the display field causes a substantially linear area of illumination.

7. An analog display as defined in claim 1 wherein the scan means is a rotatable mirror having a drive motor connected thereto for continuously rotating the mirror, the display further comprising a resolver for producing output pulses representing increments of angular rotation of the mirror relative to the display field, said output pulses being connected to the controller to maintain a count representing the angular position of the light beam across the display field.

8. The analog display as defined in claim 7 further comprising a frequency multiplier connected between the resolver and the controller.

9. A grouping of analog displays representing measured signal quantities comprising:
    a plurality of display fields the relative positions within each representing analog values of respective measured quantities;
    a pulsed light source producing a light beam;
    means for causing the light beam to repeatedly sweep across the display fields in a predetermined sequence; and
    a controller responsive to respective measured quantities to repeatedly turn the light source on at locations within respective display fields which are analog representations of the respective measured quantities.

10. A grouping of analog displays as defined in claim 9 wherein the pulsed light source is a laser light source.

11. A grouping of analog displays as defined in claim 9 wherein the sweep means is a rotating mirror having multiple reflective surfaces.

12. A grouping of analog displays as defined in claim 11 further including a motor for rotating the mirror.

13. A grouping of analog displays as defined in claim 9 further including a light detector positioned to receive the beam at a reference position, the light detector being connected to the controller for calibration purposes.

14. A grouping of analog displays as defined in claim 9 wherein the display fields are angled relative to the light beam such that the incidence of the light beam on the display field causes a linear area of illumination.

15. A grouping of analog displays as defined in claim 9 wherein the sweep means is a rotatable mirror having a drive motor connected thereto for rotating the mirror at a continuous rate of speed, the display further comprising a resolver for producing output pulses representing increments of angular rotation of the mirror relative to the display field, said output pulses being connected to the controller to maintain a count representing the angular position of the light beam across the display field.

16. The grouping of analog displays as defined in claim 15 further comprising a frequency multiplier connected between the resolver and the controller.

17. The grouping of analog displays defined in claim 11 wherein the edges of the mirror between the reflective surfaces are rounded.

18. A method for displaying the value of a measured quantity comprising the steps of:
    providing a display field within which values of the measured quantity are represented in analog fashion by relative position within the display field;
    providing a light beam which is repeatedly swept across the display field;
    providing a signal representative of the measured quantity; and
    using the signal representing the measured quantity to turn on the light source for a short time when it reaches a location within the display field which represents the measured quantity value.

19. The method of claim 18 further comprising the step of detecting the light beam at a reference location for calibration purposes.

20. The method of claim 18 wherein the step of sweeping the light beam across the display field is carried out by reflecting the light beam.

* * * * *